United States Patent
Gao et al.

(10) Patent No.: US 10,855,397 B2
(45) Date of Patent: Dec. 1, 2020

(54) DOWNSTREAM DATA FRAME TRANSMISSION METHOD AND DEVICE

(71) Applicant: Huawei Technologies Co., Ltd., Shenzhen (CN)

(72) Inventors: Bo Gao, Wuhan (CN); Shiwei Nie, Dongguan (CN); Lei Jing, Wuhan (CN); Zhenping Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 16/250,708

(22) Filed: Jan. 17, 2019

(65) Prior Publication Data

US 2019/0158220 A1  May 23, 2019

Related U.S. Application Data (63) Continuation of application No. PCT/CN2016/090318, filed on Jul. 18, 2016.

(51) Int. Cl.
| | |
|---|---|
| *H04L 1/00* | (2006.01) |
| *H04B 10/516* | (2013.01) |
| *H04B 10/27* | (2013.01) |
| *H04L 7/00* | (2006.01) |
| *H04J 14/02* | (2006.01) |

(52) U.S. Cl.
CPC ........ *H04L 1/0041* (2013.01); *H04B 10/27* (2013.01); *H04B 10/516* (2013.01); *H04L 1/0009* (2013.01); *H04L 1/0075* (2013.01); *H04L 7/0075* (2013.01); *H04J 14/0223* (2013.01)

(58) Field of Classification Search
CPC ... H04L 1/0041; H04L 1/0009; H04L 1/0075; H04L 7/0075; H04B 10/516; H04B 10/27; H04J 14/0223
See application file for complete search history.

(56) References Cited

U.S. PATENT DOCUMENTS

| | | | |
|---|---|---|---|
| 2003/0005385 A1 | 1/2003 | Stieger | |
| 2005/0172199 A1 | 8/2005 | Miller et al. | |
| (Continued) | | | |

FOREIGN PATENT DOCUMENTS

| | | |
|---|---|---|
| CN | 101047470 A | 10/2007 |
| CN | 101867442 A | 10/2010 |
| (Continued) | | |

*Primary Examiner* — Thien Nguyen
(74) *Attorney, Agent, or Firm* — Leydig, Voit & Mayer, Ltd.

(57) ABSTRACT

A downstream data frame transmitting method includes: generating, by an optical line terminal (OLT), a downstream data frame, where the downstream data frame includes a frame header and a payload, the frame header includes a physical synchronization sequence (Psync) field, and the Psync field is used to identify the downstream data frame, where when a value of the Psync field is a first value, the Psync field is further used to indicate that payload data is protected by forward error correction (FEC); or when a value of the Psync field is a second value, the Psync field is further used to indicate that payload data is not protected by FEC; and sending, by the OLT, the downstream data frame. Embodiments of the present invention can reduce a bit error rate of a FEC indication status and improve reliability of the FEC indication status.

16 Claims, 4 Drawing Sheets

(56) References Cited

U.S. PATENT DOCUMENTS

| | | | |
|---|---|---|---|
| 2012/0321313 A1 | 12/2012 | Jin | |
| 2013/0121697 A1* | 5/2013 | Luo | H04B 10/27 |
| | | | 398/58 |
| 2014/0181616 A1 | 6/2014 | Arunarthi et al. | |
| 2015/0326346 A1* | 11/2015 | Yoo | H04L 1/0075 |
| | | | 398/52 |

FOREIGN PATENT DOCUMENTS

| | | |
|---|---|---|
| CN | 102195738 A | 9/2011 |
| CN | 102695102 A | 9/2012 |

* cited by examiner

An OLT generates a downstream data frame, where the downstream data frame includes a Psync field, and the Psync field is used to identify the downstream data frame, where when a value of the Psync field is a first value, the Psync field is further used to indicate that payload data is protected by FEC; or when the value of the Psync field is a second value, the Psync field is further used to indicate that payload data is not protected by FEC — 301

Send the downstream data frame — 302

DOWNSTREAM DATA FRAME TRANSMISSION METHOD AND DEVICE

CROSS-REFERENCE TO RELATED APPLICATIONS

This application is a continuation of International Patent Application No. PCT/CN2016/090318, filed on Jul. 18, 2016, the disclosure of which is hereby incorporated by reference in its entirety.

TECHNICAL FIELD

The present invention relates to the gigabit passive optical network (GPON) field, and in particular, to a downstream data frame transmission method and a device.

BACKGROUND

The next-generation passive optical network 2 (NG-PON2) standard by the International Telecommunication Union-Telecommunication Standardization Sector (ITU-T) has been released. The standard is mainly intended for a time- and wavelength-division multiplexed passive optical network (TWDM-PON). A downstream data frame in a TWDM-PON system includes a frame header and a payload. As is specified in the standard, the frame header is protected by a forward error correction (FEC) code that has a relatively weak error correction capability, and in the TWDM-PON system, a BCH(63,12,1) coding manner is used to protect the frame header; and the payload is protected by a FEC code that has a relatively strong error correction capability, and in the TWDM-PON system, an RS(248,216) coding manner of a Reed-Solomon (RS) code is used to protect the payload. A target input bit error rate on a receiving side of a downstream optical network unit (ONU) is 1e-3, and an output bit error rate reaches 1e-12 at best in the order of magnitude after error correction.

When a bit error rate of input data is 1e-3, theoretically, the bit error rate of the data is decreased to 1.8170e-6 after BCH(63,12,1) error correction, and the bit error rate of the data is decreased to 2.6146e-13 after RS(248,216) error correction. The two types of error-correcting codes differ significantly in performance, and reliability of the frame header in the downstream data frame is lower than that of the payload by seven orders of magnitude. However, the frame header includes a FEC indication field. The field is used to indicate a FEC status of current payload data and has a relatively high requirement on a bit error rate. A bit error rate of the order of magnitude of 1e-6 cannot meet a requirement of the field. If the field cannot be correctly parsed, processing is inconsistent on an optical line terminal (OLT) side and an ONU side, affecting normal reception of payload data by the ONU.

SUMMARY

Embodiments of the present invention provide a downstream data frame transmission method, so as to resolve the following problem: Because a data bit error rate after error correction still cannot meet a requirement of a FEC indication field, processing is inconsistent on an OLT side and an ONU side, affecting normal reception of payload data by an ONU.

According to a first aspect, a downstream data frame transmitting method is provided, where the method is applied to a passive optical network (PON) system and includes: generating, by an OLT, a downstream data frame, where the downstream data frame includes a frame header and a payload, the frame header includes a physical synchronization sequence Psync field, and the Psync field is used to identify the downstream data frame, where when a value of the Psync field is a first value, the Psync field is further used to indicate that payload data is protected by forward error correction (FEC); or when a value of the Psync field is a second value, the Psync field is further used to indicate that payload data is not protected by FEC; and sending, by the OLT, the downstream data frame.

The Psync field in this embodiment of the present invention is used to indicate a FEC on/off status and identify the downstream data frame, and has a length of 8 bytes. Reliability of a FEC on/off indication status can be improved through fuzzy matching.

With reference to the first aspect, in a first possible implementation of the first aspect, a Hamming distance between the first value and the second value is the largest. Optimal error correction performance can be obtained.

With reference to the first aspect or the first possible implementation of the first aspect, in a second possible implementation of the first aspect, the Psync field is further used to determine whether an ONU enters a synchronization state.

With reference to the first aspect or the first possible implementation of the first aspect, in a third possible implementation of the first aspect, the frame header includes a reserved (REV) field, and the REV field is used to increase a length of the Psync field. Reliability of a FEC indication status is further improved.

With reference to the first aspect or the first possible implementation of the first aspect, in a fourth possible implementation of the first aspect, the PON system is specifically a time- and wavelength-division multiplexed gigabit passive optical network TWDM-PON or a 10-gigabit symmetric passive optical network (XGSPON) system.

According to a second aspect, a downstream data frame receiving method is provided, where the method is applied to a passive optical network (PON) system and includes: determining, by an ONU based on a physical synchronization sequence Psync field of a downstream data frame, whether to enter a synchronization state, where the downstream data frame includes a frame header and a payload, the frame header includes the Psync field, and the Psync field is used to identify the downstream data frame, where when a value of the Psync field is a first value, the Psync field is further used to indicate that payload data is protected by forward error correction (FEC); or when a value of the Psync field is a second value, the Psync field is further used to indicate that payload data is not protected by FEC; and if the ONU enters the synchronization state, determining, by the ONU based on the Psync field of the downstream data frame, whether to decode the payload data.

With reference to the second aspect, in a first possible implementation of the second aspect, a Hamming distance between the first value and the second value is the largest. Optimal error correction performance can be obtained.

With reference to the second aspect or the first possible implementation of the second aspect, in a second possible implementation of the second aspect, the determining, based on a Psync field of a downstream data frame, whether to enter a synchronization state specifically includes the following: the ONU is initially in a searching state; if a found downstream data frame matches the first value or the second value and then matches a super frame counter structure field, the ONU enters a presynchronization state; and if a next found downstream data frame matches the first value or the second value and then matches the super frame counter structure field, the ONU enters the synchronization state.

With reference to the second aspect or the first possible implementation of the second aspect, in a third possible implementation of the second aspect, the frame header includes a reserved (REV) field, and the REV field is used to increase a length of the Psync field. Reliability of a FEC indication status is further improved.

With reference to the second aspect or the first possible implementation of the second aspect, in a fourth possible implementation of the second aspect, the PON system is specifically a time- and wavelength-division multiplexed gigabit passive optical network (TWDM-PON) or a 10-gigabit symmetric passive optical network (XGSPON) system.

According to a third aspect, an OLT is provided, where the OLT is applied to a passive optical network (PON) system and includes a framer and a transmitter, where the framer is configured to: generate a downstream data frame and send the downstream data frame to the transmitter, where the downstream data frame includes a frame header and a payload, the frame header includes a physical synchronization sequence Psync field, and the Psync field is used to identify the downstream data frame, where when a value of the Psync field is a first value, the Psync field is further used to indicate that payload data is protected by forward error correction (FEC); or when a value of the Psync field is a second value, the Psync field is further used to indicate that payload data is not protected by FEC; and the transmitter is configured to: receive the downstream data frame from the framer and send the downstream data frame.

The Psync field in this embodiment of the present invention is used to indicate a FEC on/off status and identify the downstream data frame, and has a length of 8 bytes. Reliability of a FEC on/off indication status can be improved through fuzzy matching.

With reference to the third aspect, in a first possible implementation of the third aspect, a Hamming distance between the first value and the second value is the largest. Optimal error correction performance can be obtained.

With reference to the third aspect or the first possible implementation of the third aspect, in a second possible implementation of the third aspect, the Psync field is further used to determine whether an ONU enters a synchronization state.

With reference to the third aspect or the first possible implementation of the third aspect, in a third possible implementation of the third aspect, the frame header includes a reserved (REV) field, and the REV field is used to increase a length of the Psync field. Reliability of a FEC indication status is further improved.

With reference to the third aspect or the first possible implementation of the third aspect, in a fourth possible implementation of the third aspect, the PON system is specifically a time- and wavelength-division multiplexed gigabit passive optical network (TWDM-PON) or a 10-gigabit symmetric passive optical network (XGSPON) system.

According to a fourth aspect, an ONU is provided, where the ONU is applied to a passive optical network (PON) system and includes a synchronous state machine and a determiner, where the synchronous state machine determines, based on a physical synchronization sequence Psync field of a downstream data frame, whether the ONU enters a synchronization state, and if the ONU enters the synchronization state, sends the downstream data frame to the determiner, where the downstream data frame includes a frame header and a payload, the frame header includes the Psync field, and the Psync field is used to identify the downstream data frame, where when a value of the Psync field is a first value, the Psync field is further used to indicate that payload data is protected by forward error correction FEC; or when a value of the Psync field is a second value, the Psync field is further used to indicate that payload data is not protected by (FEC); and the determiner is configured to receive the downstream data frame from the synchronous state machine, and determine, based on the Psync field of the downstream data frame, whether to decode the payload data.

With reference to the fourth aspect, in a first possible implementation of the fourth aspect, a Hamming distance between the first value and the second value is the largest. Optimal error correction performance can be obtained.

With reference to the fourth aspect or the first possible implementation of the fourth aspect, in a second possible implementation of the fourth aspect, the synchronous state machine is specifically configured to: be initially in a searching state; if a found downstream data frame matches the first value or the second value and then matches a super frame counter structure field, enable the ONU to enter a presynchronization state; and if a next found downstream data frame matches the first value or the second value and then matches the super frame counter structure field, enable the ONU to enter the synchronization state.

With reference to the fourth aspect or the first possible implementation of the fourth aspect, in a third possible implementation of the fourth aspect, the frame header includes a reserved (REV) field, and the REV field is used to increase a length of the Psync field. Reliability of a FEC indication status is further improved.

With reference to the fourth aspect or the first possible implementation of the fourth aspect, in a fourth possible implementation of the fourth aspect, the PON system is specifically a time- and wavelength-division multiplexed gigabit passive optical network (TWDM-PON) or a 10-gigabit symmetric passive optical network (XGSPON) system.

According to a fifth aspect, a downstream data frame sending and receiving system is provided, including: the foregoing OLT according to the third aspect or any possible implementation of the third aspect, and the foregoing ONU according to the fourth aspect or any possible implementation of the fourth aspect.

The Psync field in this embodiment of the present invention is used to indicate a FEC on/off status and identify the downstream data frame, and has a length of 8 bytes. Reliability of a FEC on/off indication status can be improved through fuzzy matching.

BRIEF DESCRIPTION OF DRAWINGS

To describe technical solutions in embodiments of the present invention more clearly, the following briefly describes the accompanying drawings. The accompanying drawings show merely some exemplary embodiments of the present invention, and a person of ordinary skill in the art may still derive other drawings from these accompanying drawings without creative efforts.

DESCRIPTION OF EMBODIMENTS

The following clearly describes technical solutions in embodiments of the present invention with reference to the accompanying. The described embodiments are some rather than all of the embodiments of the present invention. Other embodiments obtained by a person of ordinary skill in the art based on the described embodiments of the present invention without creative efforts may fall within the protection scope of the present invention.

In the following description, specific details such as a particular system structure, an interface, and a technology are set forth in an illustrative but not a restrictive sense to make a thorough understanding of the present invention. However, a person skilled in the art should know that the present invention may be implemented in other embodiments without these specific details. In other cases, detailed descriptions of well-known apparatuses, circuits, and methods may be omitted, so that the present invention is described without being obscured by unnecessary details.

When ordinal numbers such as "first" and "second" are used in the embodiments of the present invention, unless the ordinal numbers represent a sequence according to the context, it should be understood that the ordinal numbers are merely used for differentiation.

For ease of understanding of a person skilled in the art, technical solutions of the present invention are described in the present invention by using the following exemplary embodiments.

Figure 1:
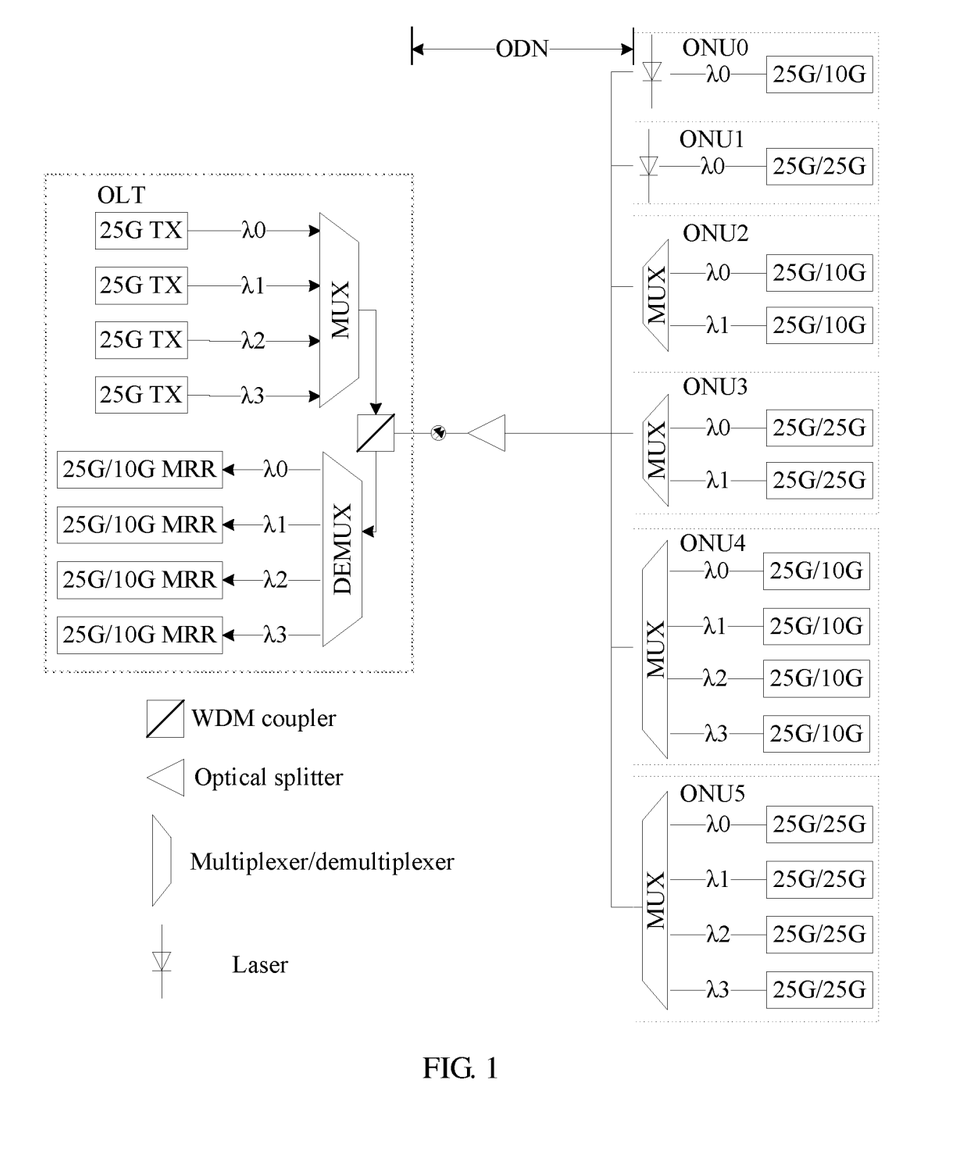
FIG. 1 is an architectural diagram of a system to which an embodiment of the present invention is applied according to the present invention.

In an embodiment of the present invention, a TWDM-PON system is used as an example, and an architectural diagram shown in FIG. 1 of a system to which a method according to an embodiment of the present invention is applied is provided. It can be learned from the figure that the TWDM-PON system mainly includes three parts: an OLT, an optical distribution network (ODN), and an ONU/optical network terminal (ONT). The OLT is located at a central office end, is responsible for allocating and controlling a channel connection, and performs real-time monitoring, management, and maintenance on an entire TWDM-PON network. The ONU/ONT is located at a user end (or a customer-premises side) and implements access of a user terminal. The ODN includes a passive optical splitter (POS) and an optical fiber line and implements network connections between the OLT and ONUs. A difference between the ONU and the ONT lies in that the ONT is directly located at the user end, while another network exists between the ONU and a user. However, without differentiation in this patent, an ONU is used for uniform representation.

In the TWDM-PON system, downstream refers to a direction from the OLT to the ONU, and four wavelengths are used and coexist in a wavelength division multiplexing (WDM) manner. At each downstream wavelength, a payload data stream is broadcast in a time division multiplexing (TDM) manner to all ONUs corresponding to a receiver wavelength. However, each ONU receives only data that carries an identifier of the ONU. Conversely, upstream refers to a direction from the ONU to the OLT, one of the four wavelengths is used, and different upstream wavelengths coexist in a WDM manner. Because all the ONUs share the ODN, and ONUs with a same transmitter wavelength share a same receiver of the OLT, to ensure that upstream data of ONUs at a same upstream wavelength does not conflict, these ONUs send data at the upstream wavelength in a Time Division Multiple Access (TDMA) manner. To be specific, the OLT allocates a timeslot to each ONU, and each ONU needs to send data strictly based on the timeslot that is allocated by the OLT.

Figure 2:
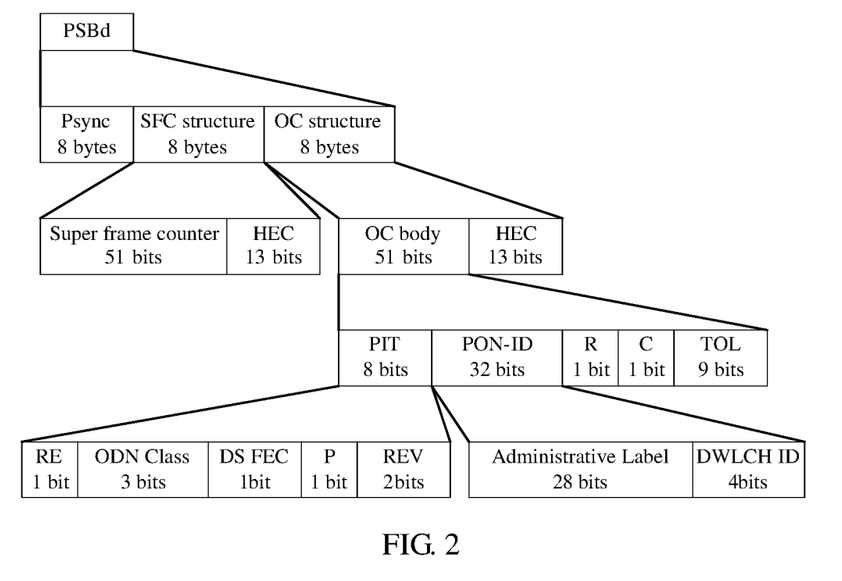
FIG. 2 is a structural diagram of a frame header of a downstream frame of a TWDM-PON.

A downstream frame of a TWDM-PON is a framing sublayer (FS) frame. The FS frame includes two portions: a frame header and a payload. A structure of the frame header is shown in FIG. 2. PSBd in the figure indicates the frame header. The frame header includes an 8-byte physical synchronization sequence (Psync) field, an 8-byte super frame counter structure (SFC structure) field, and an 8-byte operational control structure (OC structure) field. The SFC structure field includes a 51-bit super frame counter (SFC) field and a 13-bit hybrid error correction (HEC) field; the OC structure field includes a 51-bit operational control body (OC body) field and a 13-bit HEC field; and the OC body field includes a 2-bit reserved field (REV in FIG. 2) and a 1-bit FEC indication field (DS FEC in FIG. 2). The FEC indication field is used to indicate a FEC status of payload data and has a relatively high requirement on a bit error rate. If the FEC indication field cannot be correctly parsed, processing is inconsistent on an OLT side and an ONU side, affecting normal reception of payload data by the ONU.

It should be noted that a 10-gigabit symmetric passive optical network (XGSPON) and a TWDM-PON have a same downstream frame structure, and this embodiment of the present invention is also applicable to the XGSPON.

Figure 3:
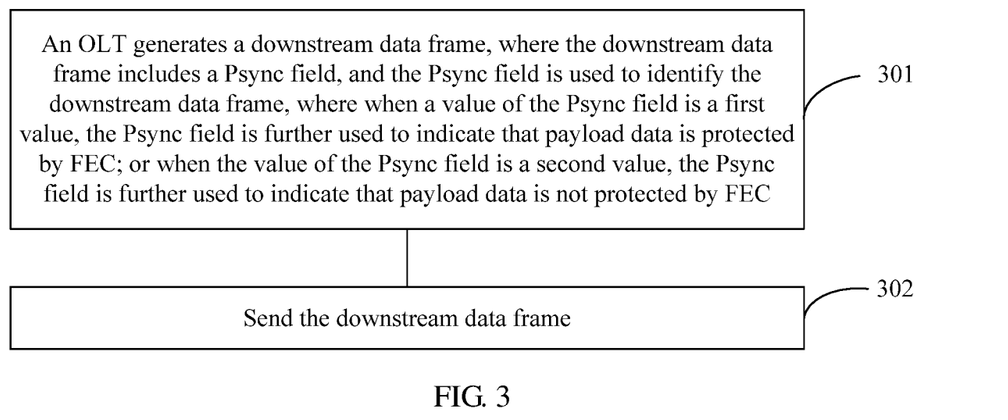
FIG. 3 is a flowchart of a downstream data frame sending method according to an embodiment of the present invention.

As shown in FIG. 3, an embodiment of the present invention provides a downstream data frame transmitting method, including:

301. An OLT generates a downstream data frame, where the downstream data frame includes a frame header and a payload, and the frame header includes a Psync field.

Specifically, the Psync field has a length of 8 bytes, and is used to identify the downstream data frame. When a value of the Psync field is a first value, the Psync field is used to indicate that payload data is protected by FEC; or when a value of the Psync field is a second value, the Psync field is used to indicate that payload data is not protected by FEC. The first value and the second value are different.

Optionally, a Hamming distance between the two values of the Psync field is required to be the largest, where one value is a bitwise complement of the other. For example, 0x0000000000000000 may be used to indicate that FEC is off, and 0xffffffffffffffff may be used to indicate that FEC is on. Fuzzy matching is performed on the Psync field, and a specific quantity of error bits are allowed, so that better error correction performance can be obtained. The quantity of error bits needs to be less than half of the length of the Psync field, and a specific value is not limited in this embodiment of the present invention.

Optionally, the Psync field is further used to determine whether an ONU enters a synchronization state.

The Psync field in the NGPON2 standard has only one fixed value and is used to determine whether the ONU enters the synchronization state. The following describes a downstream synchronization process.

First, the ONU is initially in a searching state. In the searching state, the ONU searches for a Psync field bit by bit and byte by byte in the downstream data frame. Once finding a correctly matched Psync field, the ONU verifies whether 8-byte data following the Psync field is an SFC structure field. If the 8-byte data is not the SFC structure field, the ONU remains in the searching state and keeps searching for a Psync field; or if the 8-byte data is the SFC structure field, the ONU locally stores a copy of a value of the SFC structure field and enters a presynchronization state. After entering the presynchronization state, the ONU further performs verification on a next downstream data frame. When both a Psync field and an SFC structure field are verified, the ONU enters the synchronization state and can correctly receive the downstream data frame. Otherwise, the ONU returns to the searching state. After the ONU enters the presynchronization state, the Psync field and the SFC structure field require only fuzzy matching.

Further, once the ONU enters the synchronization state, the ONU can always remain in the synchronization state, provided that the Psync field and the SFC structure field are both successfully verified. If only one item is successfully verified, the ONU enters a resynchronization state. Once the ONU enters the resynchronization state, the ONU can return to the synchronization state, provided that one correct Psync field is matched and an SFC structure field is successfully verified. In the resynchronization state, if M−1 consecutive error Psync fields or SFC structure fields are detected, the ONU declares a downstream synchronization failure, discards a local SFC structure copy, and reenters the searching state. A recommended value of M is 3.

In this embodiment of the present invention, the Psync field is used to indicate a FEC on/off status of payload data. When a value of the Psync field is a first value, the Psync field is used to indicate that payload data is protected by FEC; or when a value of the Psync field is a second value, the Psync field is used to indicate that payload data is not protected by FEC. When the ONU is in a searching state, after the first value or the second value is matched, the ONU performs verification on 8-byte data following the Psync field, and if the verification succeeds, the ONU enters a presynchronization state. When the ONU is in the presynchronization state, the ONU also only needs to match the first value or the second value before the Psync field is considered to be verified, and then continues to verify the SFC structure field. If the SFC structure field is also successfully verified, the ONU enters a synchronization state.

Optionally, in another embodiment, the frame header of the downstream data frame includes a reserved (REV) field, and the REV field is used to increase the length of the Psync field. Reliability of a FEC indication status is further improved.

Optionally, the frame header of the downstream data frame further includes an SFC field. N bits may be separated from the SFC field, to increase the length of the Psync field, where N is a positive integer that is not greater than 9.

Specifically, the SFC field is used to count a quantity of downstream data frames. Because the NGPON2 standard specifies that a length of each downstream data frame is 125 μs, assuming that downstream data frames are sent uninterruptedly, it takes 8,925 years to use up a 51-bit SFC field. If the length of the SFC field is shortened to 42 bits, it takes 17.43 years to use up the SFC field, still beyond a life cycle of the device. Therefore, the SFC field of 42 bits can fully meet a requirement. If the length of the SFC field is shortened to 41 bits, time that it takes to use up the SFC field is shorter than the life cycle of the device. Therefore, the SFC field can provide a maximum of 9 bits to increase the length of the Psync field.

Optionally, a FEC indication field may also be used to increase the length of the Psync field. Reliability of a FEC indication status is further improved.

302. The OLT sends the downstream data frame.

Another embodiment of the present invention provides a downstream data frame transmitting method, including:

generating, by an OLT, a downstream data frame, where the downstream data frame includes a frame header and a payload, and the frame header includes an SFC field; and separating N bits from the SFC field to form a first field, where a length of the first field is not less than 5 bits. When a value of the first field is a third value, the first field is used to indicate that payload data is protected by FEC; or when a value of the first field is a fourth value, the first field is used to indicate that payload data is not protected by FEC. N is a positive integer that is not greater than 9, and the third value and the fourth value are different.

Figure 4:
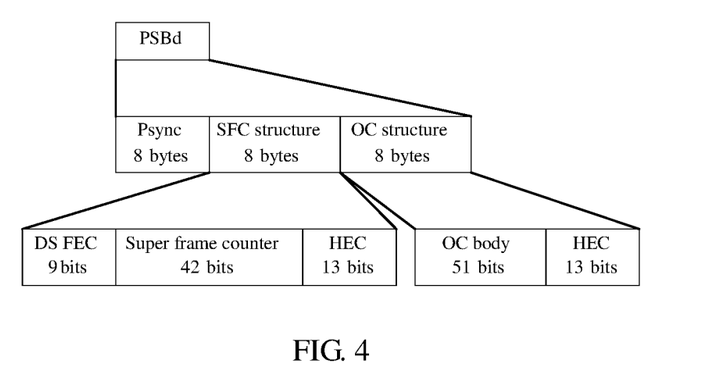
FIG. 4 shows a structure of a frame header of a downstream data frame according to another embodiment of the present invention.

FIG. 4 shows a possible frame header structure according to an embodiment of the present invention. Optionally, a Hamming distance between the third value and the fourth value is the largest, so that a specific quantity of error bits are allowed. Reliability of the first field can be improved through fuzzy matching. A maximum quantity of error bits needs to be less than half of the length of the first field.

It should be noted that, when the length of the first field exceeds 2 bits, a bit error rate of a FEC indication status can be decreased through fuzzy matching. However, a quantity of allowed error bits cannot exceed half of the length of the first field. If the length of the first field is less than 5 bits, only one error bit is allowed. A larger quantity of allowed error bits indicates a lower bit error rate. Specifically, when the length of the first field is 3 bits, only one error bit is allowed, and a bit error rate of the FEC indication status is 2.998e-6 after error correction, which is not better than an error correction capability of the prior art. When the length of the first field is 5 bits, two error bits are allowed, and a bit error rate of the FEC indication status is 9.985e-09 after error correction, which is better than the error correction capability of the prior art. Therefore, the length of the first field is not less than 5 bits.

When the length of the first field is 9 bits, assuming that 0b000000000 indicates that FEC is off, and 0b111111111 indicates that FEC is on, a maximum of four error bits can be allowed on a premise that there is no erroneous determining. When a bit error rate of an input downstream data frame is 1e-3, a bit error rate of a FEC indication status of the downstream data frame is decreased to 1.2568e-13 after error correction. Reliability of the FEC indication status is substantially improved.

A specific name, a length, a location, and a specific value of the first field have many manners, which are not limited in this embodiment of the present invention.

Optionally, the first field is further used to determine whether an ONU enters a synchronization state.

Specifically, when the ONU is in a searching state, after a Psync field and an SFC structure field that are expected are matched based on an existing implementation mechanism, either of the two possible values of the first field further needs to be matched, and then it is considered that a valid downstream frame is found, and the ONU enters a presynchronization state. When the ONU is in the presynchronization state, after the Psync field and the SFC structure field are matched, either of the two values of the first field further needs to be matched, and then the ONU considers that the current downstream frame is verified, and enters the synchronization state. After the ONU enters the presynchronization state, the Psync field, the SFC structure, and the first field require only fuzzy matching.

Once the ONU enters the synchronization state, the ONU can always remain in the synchronization state, provided that the Psync field, the SFC structure field, and the first field are all successfully verified. If one item fails to be verified, the ONU enters a resynchronization state. Once the ONU enters the resynchronization state, the ONU can return to the synchronization state, provided that a correct Psync field, SFC structure field, and first field are matched.

In the resynchronization state, if M−1 consecutive error Psync fields or SFC structure fields or first fields are detected, the ONU declares a downstream synchronization failure and reenters the searching state. A recommended value of M is 3. Alternatively, to further reduce a synchronization failure probability, synchronization may be considered to fail only when both the Psync field and the SFC structure field fail to be matched and neither of the two possible values of the first field is successfully matched; and the ONU reenters the searching state.

Optionally, the separating N bits from the SFC field to form a first field specifically includes: separating the N bits from the SFC field and combining the N bits and a FEC indication field to form the first field, where the FEC indication field is a field that is originally used to indicate a FEC on/off status of payload data. The FEC indication field and the first field may be combined, to increase a length of the first field. Reliability of a FEC indication status is further improved. Similarly, a 2-bit REV field may be further combined with the first field to further increase the length of the first field. The reliability of the FEC indication status is improved.

Another embodiment of the present invention provides a downstream data frame transmitting method, including:

generating, by an OLT, a downstream data frame, where the downstream data frame includes a frame header and a payload, and the frame header includes a second field; encoding the second field to form a code word, where the second field includes an SFC structure field and an OC structure field; and sending, by the OLT, the downstream data frame.

Figure 5:
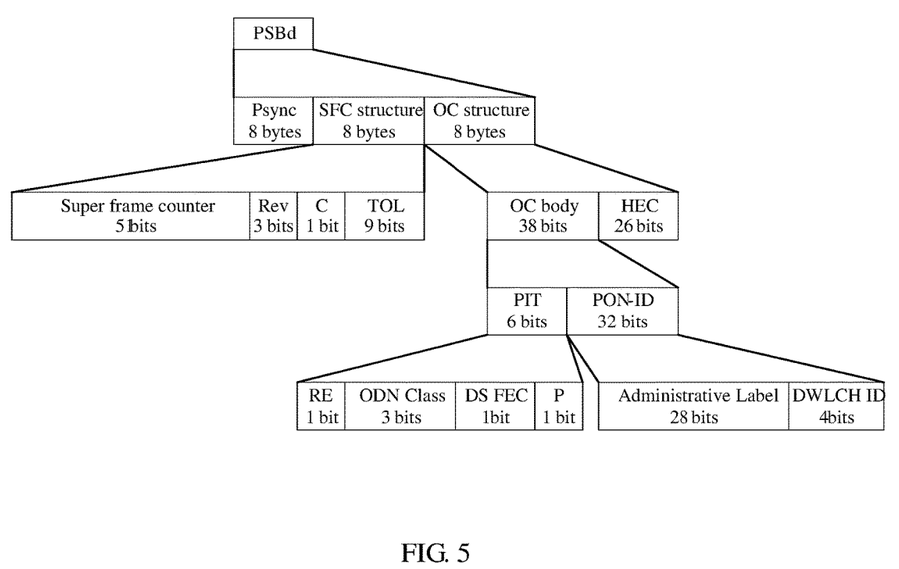
FIG. 5 shows a structure of a frame header of a downstream data frame according to another embodiment of the present invention.

Specifically, the OC structure field and the SFC structure field are combined into a BCH code word. A frame header structure of the downstream data frame is shown in FIG. 5. A 13-bit HEC field included in the OC structure field and a 13-bit HEC field included in the SFC structure field are combined into a 26-bit HEC field and the 26-bit HEC field is put into the OC structure field. Thirteen bits are taken from an OC body field and put into the SFC structure field, to ensure that sizes of the SFC structure field and the OC structure field remain unchanged. In this case, after the SFC structure field and the OC structure field are combined, a BCH(128,102,1) code word is formed. If a bit error rate of input data is 1e-3, the bit error rate of the data can be decreased to 9.0798e-09 after error correction, and reliability is improved by three orders of magnitude in comparison with that of an original BCH(63,12,1) code word.

Optionally, the HEC field in the second field further includes N bits that are separated from an SFC field, where N is a positive integer that is not greater than 9.

Figure 6:
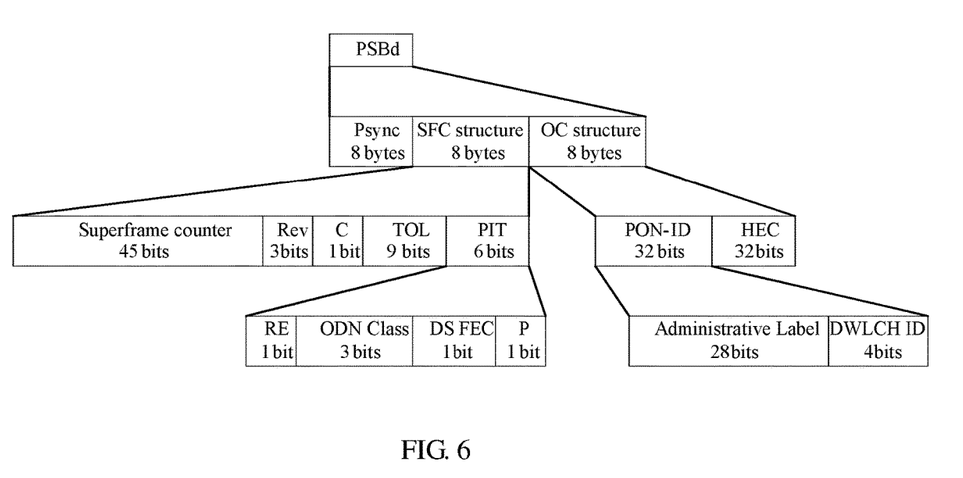
FIG. 6 shows a structure of a frame header of a downstream data frame according to another embodiment of the present invention.

It has been described in the previous embodiment that the SFC field can provide a maximum of 9 bits for another function. In this embodiment of the present invention, on the premise that lengths of the SFC structure field and the OC structure field are unchanged, six bits can be taken from the SFC field to extend the HEC field, increasing a length of the HEC field to 32 bits, as shown in FIG. 6. In this case, the SFC structure field and the OC structure field form a BCH(128,96,1) code word. If a bit error rate of input data is 1e-3, the bit error rate of the data can be decreased to 2.2082e-10 after error correction, and reliability is further improved by one order of magnitude.

Optionally, the second field further includes a Psync field.

It should be understood that FIG. 6 provides merely a possible implementation of this embodiment of the present invention. A specific location of each field, a quantity of bits taken from the SFC field, and the like are not limited in this embodiment of the present invention.

Another embodiment of the present invention provides a downstream data frame transmitting method, including:

generating, by an OLT, a downstream data frame, where the downstream data frame includes a frame header and a payload, the frame header includes a third field, the third field and payload data are encoded in a uniform manner, and an encoding manner is an original encoding manner of the payload data, where the third field includes an OC structure field, and the original encoding manner of the payload has a stronger error correction capability than an original encoding manner of the third field; and sending, by the OLT, the downstream data frame.

Figure 7:
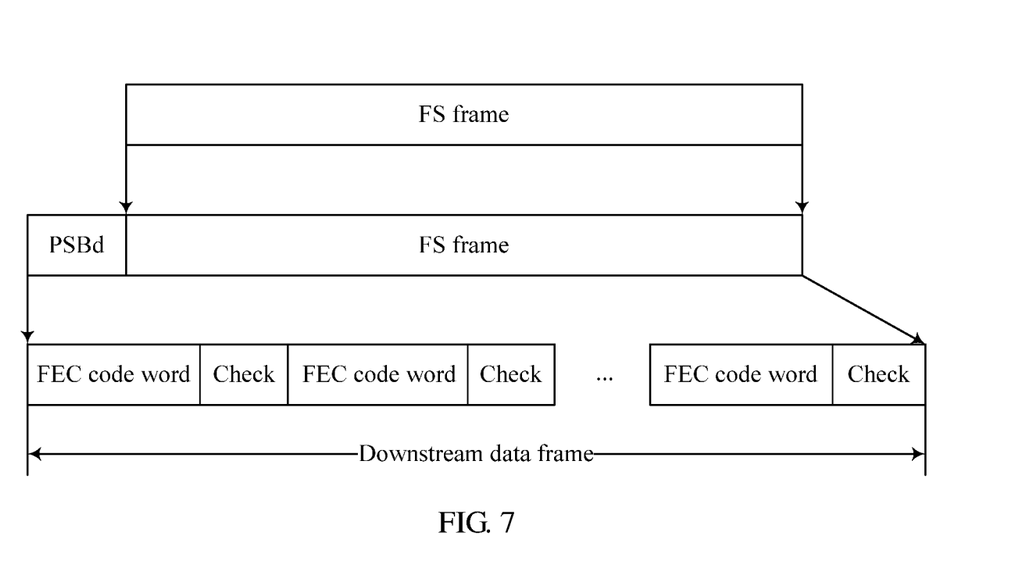
FIG. 7 shows a frame structure of a downstream data frame according to another embodiment of the present invention.

A frame structure of the downstream data frame in this embodiment of the present invention is shown in FIG. 7. The third field may include all fields of the frame header. Both the frame header and the payload data use the original encoding manner of the payload data. Error correction performance is enhanced, and reliability of a FEC indication status is improved.

Optionally, the frame header further includes a fourth field. Before uniform encoding, the fourth field is padded with useless data; and after the uniform encoding, the fourth field is padded with the payload data. The fourth field may include a Psync field or include both a Psync field and an SFC structure field.

Using a TWDM-PON as an example, when the third field includes the SFC structure field and the OC structure field, and the fourth field includes the Psync field, the OLT does not perform uniform strong FEC encoding on the Psync field together with the payload. Specifically, after FS framing is performed on the payload at a physical adaptation sublayer, the frame header is added, to form the downstream data frame. Then, the fourth field of the frame header is padded with 8-byte useless data (for example, all zeros or all ones). After the uniform strong FEC encoding is performed on the downstream data frame, the padded 8-byte useless data is replaced with the Psync field before the downstream data frame is sent, where the strong FEC encoding has a stronger error correction capability than the original encoding manner of the third field.

When the third field includes the OC structure field, and the fourth field includes the Psync field and the SFC structure field, the OLT does not perform the uniform strong FEC encoding on the Psync field and the SFC structure field with the payload. Specifically, after FS framing is performed on the payload at the physical adaptation sublayer, the frame header is added, to form the downstream data frame. Then, the fourth field is padded with 16-byte useless data (for example, all zeros or all ones). After the uniform strong FEC encoding is performed on the downstream data frame, the previously padded 16-byte useless data is replaced with the Psync field and the SFC structure field before the downstream data frame is sent.

In this embodiment of the present invention, if the uniform strong FEC encoding is not performed on the fourth field, there is no need to decode a complete strong FEC code word, thereby reducing a processing delay caused by strong FEC decoding. In addition, a location of the fourth field is padded with useless data during encoding, and there is no need to ensure correctness of the useless data. In other words, density of protection by strong FEC on other remaining information can be improved, and reliability of remaining information including the OC structure field is further improved.

It should be understood that, in addition to the TWDM-PON field, this embodiment of the present invention is also applicable to the XGSPON field.

Figure 8:
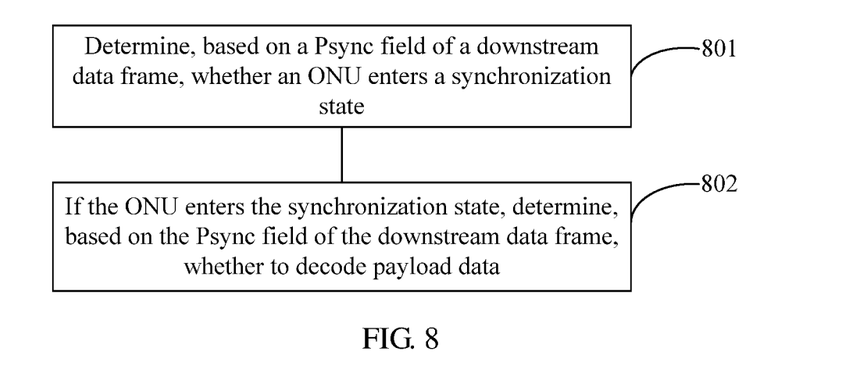
FIG. 8 is a flowchart of a downstream data frame receiving method according to another embodiment of the present invention.

As shown in FIG. 8, another embodiment of the present invention provides a downstream data frame receiving method, including:

801. An ONU determines, based on a Psync field of a downstream data frame, whether to enter a synchronization state, where the downstream data frame includes a frame header and a payload, the frame header includes the Psync field, and the Psync field is used to identify the downstream data frame; where when a value of the Psync field is a first value, the Psync field is further used to indicate that payload data is protected by FEC; or when a value of the Psync field is a second value, the Psync field is further used to indicate that payload data is not protected by FEC.

802. If the ONU enters the synchronization state, the ONU determines, based on the Psync field of the downstream data frame, whether to decode the payload data.

Optionally, a Hamming distance between the two values of the Psync field is required to be the largest, where one value is a bitwise complement of the other. Because a length of the Psync field is 8 bytes, fuzzy matching may be performed on the Psync field, and a specific quantity of error bits are allowed. The quantity of error bits needs to be less than half of the length of the Psync field, and a specific value is not limited in this embodiment of the present invention.

Specifically, a specific manner of determining whether the ONU enters the synchronization state includes the following: the ONU is initially in a searching state to search for a downstream data frame; if a found downstream data frame matches the first value or the second value and then matches an SFC structure field, the ONU enters a presynchronization state; and if a next found downstream data frame matches the first value or the second value and then matches the SFC structure field, the ONU enters the synchronization state. After the ONU enters the presynchronization state, the Psync field and the SFC structure field require only fuzzy matching.

Optionally, in another embodiment, the frame header of the downstream data frame includes a reserved REV field, and the REV field is used to increase a length of the Psync field. Reliability of a FEC indication status is further improved.

Optionally, the frame header of the downstream data frame further includes an SFC field. N bits may be separated from the SFC field, to increase the length of the Psync field, where N is a positive integer that is not greater than 9.

Specifically, the SFC field is used to count a quantity of downstream data frames. Because the NGPON2 standard specifies that a length of each downstream data frame is 125 µs, assuming that downstream data frames are sent uninterruptedly, it takes 8,925 years to use up a 51-bit SFC field. If the length of the SFC field is shortened to 42 bits, it takes 17.43 years to use up the SFC field, still beyond a life cycle of the device. Therefore, the SFC field of 42 bits can fully meet a requirement. If the length of the SFC field is shortened to 41 bits, time that it takes to use up the SFC field is shorter than the life cycle of the device. Therefore, the SFC field can provide a maximum of 9 bits to indicate a FEC on/off status.

Optionally, a FEC indication field may also be used to increase a length of the Psync field. Reliability of a FEC indication status is further improved.

Another embodiment of the present invention provides a downstream data frame receiving method, including:

determining, by an ONU based on a Psync field and a first field of a downstream data frame, whether to enter a synchronization state, where the downstream data frame includes a frame header and a payload, the frame header includes the Psync field and the first field, and the Psync field is used to identify the downstream data frame; and if the ONU enters the synchronization state, determining, by the ONU based on the first field of the downstream data frame, whether to decode payload data, where when a value of the first field is a third value, the first field is used to indicate that the payload data is protected by FEC; or when a value of the first field is a fourth value, the first field is used to indicate that the payload data is not protected by FEC.

Figure 9:
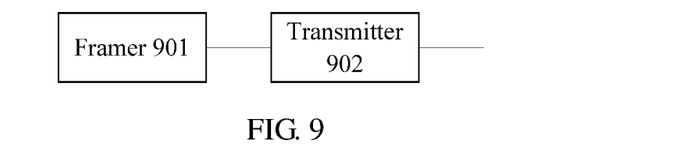
FIG. 9 is a diagram of a downstream data frame sending apparatus according to another embodiment of the present invention.

As shown in FIG. 9, an embodiment of the present invention provides an OLT, including a framer 901 and a transmitter 902.

The framer 901 is configured to: generate a downstream data frame and send the downstream data frame to the transmitter 902.

The downstream data frame includes a frame header and a payload, the frame header includes a Psync field, and the Psync field is used to identify the downstream data frame. When a value of the Psync field is a first value, the Psync field is further used to indicate that payload data is protected by FEC; or when a value of the Psync field is a second value, the Psync field is further used to indicate that payload data is not protected by FEC.

Optionally, the Psync field is further used to determine whether an ONU enters a synchronization state.

The transmitter 902 is configured to receive the downstream data frame from the framer 901 and send the downstream data frame.

Optionally, a Hamming distance between the two values of the Psync field is required to be the largest, where one value is a bitwise complement of the other. Because a length of the Psync field is 8 bytes, fuzzy matching may be performed on the Psync field, and a specific quantity of error bits are allowed. The quantity of error bits needs to be less than half of the length of the Psync field, and a specific value is not limited in this embodiment of the present invention.

Optionally, in another embodiment, the frame header of the downstream data frame includes a reserved (REV) field, and the REV field is used to increase a length of the Psync field. Reliability of a FEC indication status is further improved.

Optionally, the frame header of the downstream data frame further includes an SFC field. N bits may be separated from the SFC field, to increase the length of the Psync field, where N is a positive integer that is not greater than 9.

Optionally, a FEC indication field may also be used to increase a length of the Psync field. Reliability of a FEC indication status is further improved.

Figure 10:
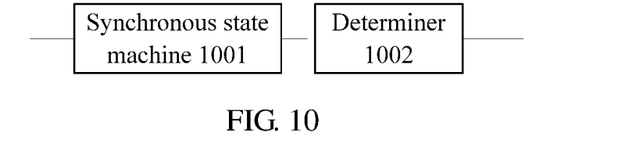
FIG. 10 is a diagram of a downstream data frame receiving apparatus according to another embodiment of the present invention.

As shown in FIG. 10, an embodiment of the present invention provides an ONU, including a synchronous state machine 1001 and a determiner 1002.

The synchronous state machine 1001 determines whether the ONU enters a synchronization state based on a Psync field of a downstream data frame, and if the ONU enters the synchronization state, sends the downstream data frame to the determiner 1002.

The downstream data frame includes a frame header and a payload, the frame header includes the Psync field, and the Psync field is used to identify the downstream data frame. When a value of the Psync field is a first value, the Psync field is further used to indicate that payload data is protected by FEC; or when a value of the Psync field is a second value, the Psync field is further used to indicate that payload data is not protected by FEC.

The determiner 1002 is configured to receive the downstream data frame from the synchronous state machine 1001 and determine, based on the Psync field of the downstream data frame, whether to decode the payload data.

Optionally, a Hamming distance between the two values of the Psync field is required to be the largest, where one value is a bitwise complement of the other. Because a length of the Psync field is 8 bytes, fuzzy matching may be performed on the Psync field, and a specific quantity of error bits are allowed. The quantity of error bits needs to be less than half of the length of the Psync field, and a specific value is not limited in this embodiment of the present invention.

Specifically, the synchronous state machine 1001 is specifically configured to: be initially in a searching state to search for a downstream data frame; if a found downstream data frame matches the first value or the second value and then matches an SFC structure field, enable the ONU to enter a presynchronization state; and if a next found downstream data frame matches the first value or the second value and then matches the SFC structure field, enable the ONU to enter the synchronization state. After the ONU enters the presynchronization state, the Psync field and the SFC structure field require only fuzzy matching.

Optionally, in another embodiment, the frame header of the downstream data frame includes a reserved REV field, and the REV field is used to increase a length of the Psync field. Reliability of a FEC indication status is further improved.

Optionally, the frame header of the downstream data frame further includes an SFC field. N bits may be separated from the SFC field, to increase the length of the Psync field, where N is a positive integer that is not greater than 9.

Optionally, a FEC indication field may also be used to increase a length of the Psync field. Reliability of a FEC indication status is further improved.

Another embodiment of the present invention provides a downstream data frame sending and receiving system, including an OLT and an ONU.

The OLT is configured to: generate a downstream data frame, where the downstream data frame includes a frame header and a payload, the frame header includes a Psync field, and the Psync field is used to identify the downstream data frame, where when a value of the Psync field is a first value, the Psync field is further used to indicate that payload data is protected by FEC; or when a value of the Psync field is a second value, the Psync field is further used to indicate that payload data is not protected by FEC; and send the downstream data frame.

The ONU is configured to: determine, based on the Psync field of the downstream data frame, whether to enter a synchronization state; and if the ONU enters the synchronization state, determine, based on the Psync field, whether to decode the payload data. The downstream data frame includes the frame header and the payload, the frame header includes the Psync field, and the Psync field is used to identify the downstream data frame. When the value of the Psync field is the first value, the Psync field is further used to indicate that the payload data is protected by FEC; or when the value of the Psync field is the second value, the Psync field is further used to indicate that the payload data is not protected by FEC.

It should be understood that "one embodiment" or "an embodiment" mentioned throughout this specification means that particular features, structures, or characteristics related to the embodiment are included in at least one embodiment of the present invention. Therefore, "in an embodiment" or "in an embodiment" appearing throughout this specification does not necessarily refer to a same embodiment. In addition, these particular features, structures, or characteristics may be combined in one or more embodiments by using any appropriate manner. Sequence numbers of the foregoing processes do not necessarily mean execution sequences in embodiments of the present invention. The execution sequences of the processes should be determined based on functions and internal logic of the processes, and should not be construed as any limitation to the implementation processes of the embodiments of the present invention.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

In summary, the foregoing description is merely example embodiments of technical solutions of the present invention, but is not intended to limit the protection scope of the present invention. Any modification, equivalent replacement, or improvement made without departing from the spirit and principle of the present invention may fall within the protection scope of the present invention.

Additionally, statements made herein characterizing the invention refer to an embodiment of the invention and not necessarily all embodiments.

What is claimed is:

1. A downstream data frame transmitting method for a passive optical network (PON) system, the method comprising:
   generating, by an optical line terminal (OLT), a downstream data frame, wherein the downstream data frame comprises a frame header and a payload, the frame header comprises a physical synchronization sequence (Psync) field, and the Psync field identifies the downstream data frame, wherein the Psync field comprises multiple bits for indicating whether or not payload data is protected by forward error correction (FEC); and
   sending, by the OLT, the downstream data frame;
   wherein a first value of the Psync field corresponds to the payload being protected by FEC, a second value of the Psync field corresponds to the payload not being protected by FEC, and a Hamming distance between the first value and the second value is as large as possible.

2. The method according to claim 1, wherein the Psync field has a length of 8 bytes.

3. The method according to claim 1, wherein the Psync field is further used to determine whether an optical network unit (ONU) enters a synchronization state.

4. The method according to claim 1, wherein the frame header comprises a reserved (REV) field for increasing a length of the Psync field.

5. A downstream data frame receiving method for a passive optical network (PON) system, the method comprising:
   determining, by an optical network unit (ONU) based on a physical synchronization sequence (Psync) field of a downstream data frame, whether to enter a synchronization state, wherein the downstream data frame comprises a frame header and a payload, the frame header comprises the Psync field, and the Psync field identifies the downstream data frame, wherein the Psync field comprises multiple bits for indicating whether or not payload data is protected by forward error correction (FEC); and
   based on the ONU entering the synchronization state, determining, by the ONU based on the Psync field of the downstream data frame, whether to decode the payload data;
   wherein a first value of the Psync field corresponds to the payload being protected by FEC, a second value of the Psync field corresponds to the payload not being protected by FEC, and a Hamming distance between the first value and the second value is as large as possible.

6. The method according to claim 5, wherein the Psync field has a length of 8 bytes.

7. The method according to claim 5, wherein determining whether to enter the synchronization state comprises:
   searching, by the ONU, for Psync fields in downstream data frames;
   based on a first downstream data frame matching the first value or the second value and further matching a super frame counter structure field, entering, by the ONU, a presynchronization state; and
   based on a next downstream data frame matching the first value or the second value and further matching the super frame counter structure field, entering, by the ONU, the synchronization state.

8. The method according to claim 5, wherein the frame header comprises a reserved (REV) field for increasing a length of the Psync field.

9. An optical line terminal (OLT) of a passive optical network (PON) system, the OLT comprising a processor and a non-transitory computer-readable medium having processor-executable instructions stored thereon, wherein the processor-executable instructions, when executed by the processor, facilitate:
   generating a downstream data frame, wherein the downstream data frame comprises a frame header and a payload, the frame header comprises a physical synchronization sequence (Psync) field, and the Psync field identifies the downstream data frame, wherein the Psync field comprises multiple bits for indicating whether or not payload data is protected by forward error correction (FEC); and
   sending the downstream data frame;
   wherein a first value of the Psync field corresponds to the payload being protected by FEC, a second value of the Psync field corresponds to the payload not being protected by FEC, and a Hamming distance between the first value and the second value is as large as possible.

10. The OLT according to claim 9, wherein the Psync field has a length of 8 bytes.

11. The OLT according to claim 9, wherein the Psync field further facilitates determining whether an optical network unit (ONU) enters a synchronization state.

12. The OLT according to claim 9, wherein the frame header comprises a reserved (REV) field for increasing a length of the Psync field.

13. An optical network unit (ONU) for a passive optical network (PON) system, the ONU comprising a processor and a non-transitory computer-readable medium having processor-executable instructions stored thereon, wherein the processor-executable instructions, when executed by the processor, facilitate:
   determining, based on a physical synchronization sequence (Psync) field of a downstream data frame, whether the ONU enters a synchronization state, wherein the downstream data frame comprises a frame header and a payload, the frame header comprises the Psync field, and the Psync field identifies the downstream data frame, wherein the Psync field comprises multiple bits for indicating whether or not payload data is protected by forward error correction (FEC); and
   determining, based on the Psync field of the downstream data frame, whether to decode the payload data;
   wherein a first value of the Psync field corresponds to the payload being protected by FEC, a second value of the Psync field corresponds to the payload not being protected by FEC, and a Hamming distance between the first value and the second value is as large as possible.

14. The ONU according to claim 13, wherein the Psync field has a length of 8 bytes.

15. The ONU according to claim 13, wherein the processor-executable instructions, when executed, further facilitate:
   searching for Psync fields in downstream data frames;
   based on a first downstream data frame matching the first value or the second value and further matching a super frame counter structure field, entering a presynchronization state; and
   based on a next downstream data frame matching the first value or the second value and further matching the super frame counter structure field, entering the synchronization state.

16. The ONU according to claim 13, wherein the frame header comprises a reserved (REV) field for increasing a length of the Psync field.

\* \* \* \* \*